June 18, 1957     A. J. JOHNSON     2,795,886
NATURAL BAIT HOLDER
Filed July 29, 1955

Adolph J. Johnson
INVENTOR.

2,795,886
NATURAL BAIT HOLDER

Adolph J. Johnson, Cloquet, Minn.

Application July 29, 1955, Serial No. 525,168

3 Claims. (Cl. 43—44.81)

This invention relates to a bait holder designed for still fishing and expressly, but not necessarily, intended to support a dead minnow in a manner wherein it appears to swim in response to the intermittent or equivalent movements imparted to the fishing line by an angler or other user thereof.

An object of the invention is to provide a holder which is simple, practical, economical and otherwise adapted for the still fishing purposes for which it is almost altogether intended for use.

In carrying out the invention there is provided a conventional-type fishhook embodying a substantially straight shank having a curvate bend at one end with a terminal barb, a lateral bend at the other end with a terminal line attaching eye, said barbed bend being adapted to pierce and anchor the tail portion of said minnow, said lateral bend being intended to penetrate the fore portion of the minnow's body so as to thus impale and harness the minnow on said fishhook, and a weight, the junctional portions of said shank and lateral bend being embedded in said weight.

The invention in its preferred embodiment is further characterized by a weight which has a substantially flat top and is so mounted in respect to the complemental shank portion that it provides a base or mounting for a thin flat plate, a plate which is of appropriate plan construction and which has its intermediate portion superimposed upon and fixed to the flat surface of the weight with the ends projecting laterally beyond the side surfaces of the weight and defining outstanding fins.

Other objects, features and advantages will become more readily apparent from the following description and drawings.

Figure 1:
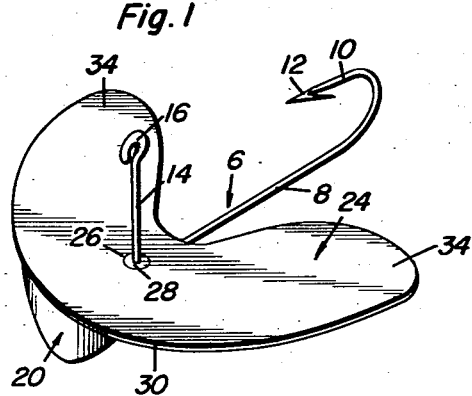
Fig. 1 is a perspective view of a natural bait holder constructed in accordance with the invention with the bait omitted.
Figure 2:
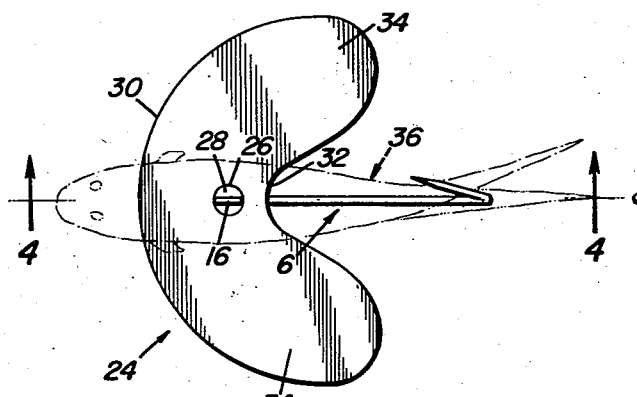
Fig. 2 is a plan view of the same showing the bait, a minnow, in phantom lines.
Figure 3:
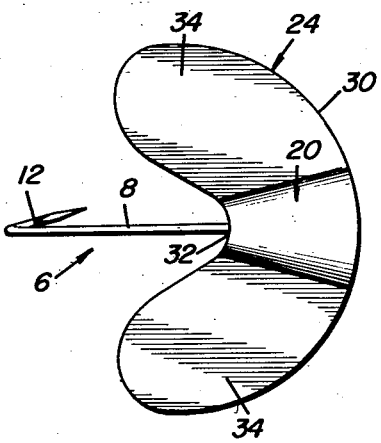
Fig. 3 is a bottom plan view.
Figure 4:
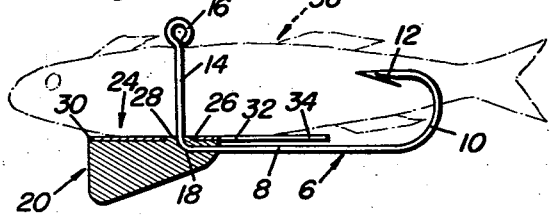
Fig. 4 is a section on line 4—4 of Fig. 2.
Figure 5:
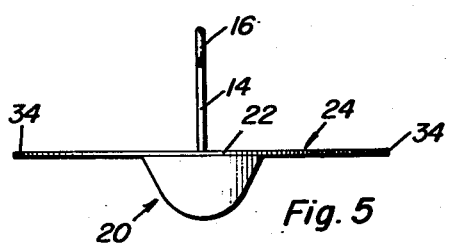
Fig. 5 is a front end elevation.

Referring now to the drawings, the fishhook (see Fig. 4) is denoted by the numeral 6 and is somewhat conventional in design and therefore is characterized by a straight shank 8 having a curvate bend 10 at one end terminating in a spear, barb or the like 12. At the opposite end the shank is provided with a lateral bend 14 extending in the same direction as the bend 10 and terminating in a fish line eye 16 on a plane above the barb as depicted in Fig. 4. Portions of the shank and bend on opposite sides of the junctional connection 18 are embedded in the upper rear end portion of a lead block or equivalent weight 20. This block is generally V-shaped in cross section as shown in Fig. 5 and the apical or vertex side is disposed downwardly and an upper side is substantially flat as at 22, to accommodate the cooperating intermediate portion of a thin metal or equivalent "planing" fin 24. Specifically this fin is a flat plate having a hole 26 (see Fig. 2) at its center with the cooperating boss 28 of the weight fitted into said hole.

It will be noticed that the plate is substantially kidney-shaped in plan and thus the leading edge is arcuately curved as at 30 while the trailing edge provides a notch-like intermediate portion 32. The plate is proportionately longer than the cross section of the weight and therefore the end portions overhang or project beyond the lengthwise sides of the weight and define rearwardly directed lobe-like fins or, as they are sometimes also called, wings 34.

A natural minnow, usually a dead minnow, is denoted by the numeral 36 and it appears in phantom lines. The tail portion is pierced and retained and anchored by the barbed hook or bend 10 and 12. The intermediate body portion rearwardly of the head is pressed down over the bend 14 and thus is impaled in the manner illustrated in the drawings. It is necessary to attach the tail first and then swing the head around on the bend 10 as a pivot and then take care of the impaling step. As already explained the bait holder is expressly designed for still fishing, not for trolling or casting. Live minnows may be used but when these die they may be brought into play thus obviating the necessity of throwing the same away. Obviously, by properly harnessing the minnow on the holder as illustrated and skillfully maneuvering the line which is attached to the eye 16 (not shown) the baited holder may be caused to sail and be otherwise maneuvered in the water to bring about the intended and desired results. The degree of activity will depend on the upward pull on the fishline. This device has been found to be of greatest advantage when used in summer or winter. It can be animated for attraction and fish catching purposes in either five or thirty feet of water or in between. In the winter when neither trolling or casting is in vogue catching fish can nevertheless be promoted because the invention is adapted for ice fishing. In the summer when the fish tend to stay down in deep cool water, the invention may be brought into play with success.

Changes in shape, size and rearrangement of parts may be resorted to in actual practice without departing from the spirit of the invention or the scope of the accompanying claims.

What is claimed as new is as follows:

1. For use by an angler when still fishing; a bait holder on which natural bait, either a live or dead minnow for example, may be impaled, said holder comprising a weight, a conventional-type fishhook embodying a substantially straight shank having a curvate bend at one end of said shank, said bend being provided with a terminal barb, a lateral bend at the other end of said shank and provided with a terminal line attaching eye, said barbed bend being adapted to pierce and anchor the tail portion of said minnow, said lateral bend being intended to penetrate the fore portion of the minnow's body so as to thus impale and harness the minnow on said fishhook, the junctional portions of said shank and lateral bend being embedded in said weight, said weight comprising an elongated lead block generally V-shaped in cross-section having a substantially flat upwardly facing surface, and a thin horizontal flat plate the intermediate portion of which is superimposed upon and fixed to said flat surface, the ends of the plate projecting laterally beyond the side surfaces of said weight and thus providing outstanding fins, whereby to assist "planing" and otherwise actively maneuvering the baited holder through water and imparting life-like movements to said bait, the top of said plate being in a plane below the plane of said barbed bend and eye on said lateral bend, whereby to facilitate impaling the bait in the manner above set forth with the bait resting, in part, atop said plate.

2. The structure defined in claim 1, and wherein said plate is substantially kidney-shaped in plan and provides an arcuate leading edge and a concave trailing edge, said weight being of a length approximately equal to the width of that portion of the plate which is superimposed thereon.

3. For use by an angler when still fishing, a holder for a natural minnow, dead or alive, comprising a weight which is generally V-shaped in bottom plan and also approximately V-shaped in cross-section and provided with a substantially flat top surface, a relatively flat thin substantially rigid plate having a centrally apertured portion superimposed and bonded to the top of said weight, a portion of said weight having a boss therein anchored in the aperture in said plate, a fishhook embodying a substantially straight shank having an arcuate bend at its trailing end, said bend having a terminal barb disposed in a plane above the shank and plate, said shank having a lateral bend at its leading end and the upper end of said bend having a terminal line attaching eye thereon, the junctional portions of the shank and lateral bend being embedded in said weight and the portion of the bend adjacent said junctional portions extending upwardly through and beyond the boss, aperture in the plate, and above the top of the plate, said line attaching eye being in a position well above the plate and being in a plane with the longitudinal axis of said shank and spaced from the barb so that the minnow may be impaled on the barbed end and the eye-equipped lateral bend in a manner to span the space therebetween and to lie in a plane above the shank and plate, the end portions of said plate being directed outwardly and rearwardly and projecting to positions well beyond the side portions of said weight.

References Cited in the file of this patent

UNITED STATES PATENTS

| | | |
|---|---|---|
| 1,295,370 | Porter | Feb. 25, 1919 |
| 2,589,007 | Landon | Mar. 11, 1952 |
| 2,589,117 | Oberbeck et al. | Mar. 11, 1952 |
| 2,599,128 | Roberts | June 3, 1952 |
| 2,719,377 | Bennett | Oct. 4, 1955 |
| 2,737,751 | Munsch | Mar. 13, 1956 |